June 11, 1968  F. KOPPELMANN ET AL  3,388,306
CONTROL CIRCUIT FOR DIRECT CURRENT MOTORS INCLUDING
SEMICONDUCTOR CELL MEANS CONNECTED ACROSS
STARTING RESISTORS
Filed Nov. 7, 1963

Inventors:
Floris Koppelmann
Karl Steimel

By: Spencer & Kaye
ATTORNEYS

United States Patent Office 3,388,306
Patented June 11, 1968

3,388,306
CONTROL CIRCUIT FOR DIRECT CURRENT MOTORS INCLUDING SEMICONDUCTOR CELL MEANS CONNECTED ACROSS STARTING RESISTORS
Floris Koppelmann, Berlin, and Karl Steimel, Konigstein-Johanniswald, Taunus, Germany, assignors to Licentia Patent-Verwaltungs-G.m.b.H., Frankfurt am Main, Germany
Filed Nov. 7, 1963, Ser. No. 322,110
Claims priority, application Germany, Nov. 7, 1962, L 43,391
7 Claims. (Cl. 318—421)

The present invention relates to control circuits for direct current motors.

Direct current motors are conventionally started by feeding current to the armature through a number of serially connected starting resistors which, by means of mechanical switches, are taken out of the circuit, either continuously or in a step-wise manner, until the total starting resistance is zero. Such an arrangement has the drawback that the useful life of the switches, both from the mechanical as well as the electrical point of view, is shortened as the result of sparking. Furthermore, the switching equipment becomes complicated and expensive if the starting resistance is to be reduced in fine steps, with the over-all cost of the equipment being even greater if the starting resistance is to be cut out in an infinitely variable manner. Such fine step, or infinitely variable, reduction in the starting resistance is used, for example, in the case of electrically driven vehicles, such as railway locomotives.

It is, therefore, an object of the present invention to provide an arrangement for starting direct current motors in which the starting resistance is cut out continuously, i.e., infinitely variably, the switching of the resistance being carried out in a contactless manner, i.e., electronically. This is accomplished, according to the present invention, by using ohmic starting resistors whose effective resistances are continuously, i.e., steplessly, varied by the periodic switching of semiconductor elements which are rendered non-conductive by means of capacitor pulses. More particularly, the effective resistance of the starting resistors of direct current motors is, according to the present invention and essentially without the use of mechanical switches, varied between the full resistance value and zero by connecting an electronic switch in parallel with each respective resistor, the electronic switch periodically short-circuiting the starting resistors at a high pulse frequency. By changing the pulse ratio, i.e., the ratio of the length of time which the electronic switch is closed to the length of time the switch is open, the effective resistance of the resistor in circuit with the armature can be varied, in infinitely small increments, between its full resistance and zero. Inasmuch as the circuit will, in practice, always contain some inductance, the current will during the above switching action undergo but small fluctuations. The present invention also resides in an apparatus for smoothly and contactlessly controlling a motor. The starting resistor in circuit with the motor, and/or the field winding of the motor, are periodically short-circuited electronically, thereby to vary the effective resistance of the starting resistor, and/or the excitation current flowing through the field winding.

Structurally, the motor circuit according to the present invention incorporates, either wholly or in part, a motor having an armature and a field winding, starting resistor means connected in series with the armature, first semiconductor cell means connected across the starting resistor means, first variable means for periodically rendering the first cell means alternately conductive and non-conductive, second semiconductor cell means connected across the field winding, and second variable means for periodically rendering the second cell means alternately conductive and non-conductive.

Additional objects and advantages of the present invention will become apparent upon consideration of the following description when taken in conjunction with the accompanying drawings in which.

Figure 1:
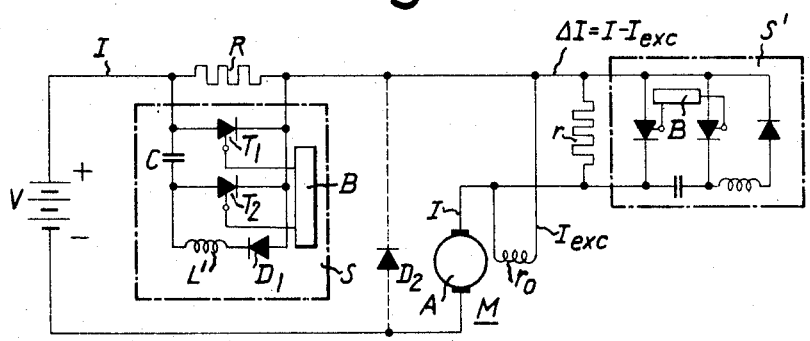
FIGURE 1 is a circuit diagram of one embodiment of the present invention, the motor being shown as a series-wound motor.

Referring now to the drawing and to FIGURE 1 thereof in particular, the same shows a series motor M connected across a source V of direct current, such as a battery. The motor has an armature A and a field winding. The series-circuit $r_0$ connected in series with the armature. The series-circuit incorporating the armature A and field winding $r_0$ also includes a starting resistor R, there being a further resistor $r$ connected in parallel with the field winding $r_0$. The resistors R and $r$ have connected in parallel with them two electronic switches S and S', respectively, which switches permit the respective resistors to be short-circuited throughout given time intervals so that the current will, for the duration of these periods, flow not through the respective resistors but through the respective switches. Each of the electronic switches is shown as comprising a controllable semiconductor cell $T_1$ which, with the help of a capacitor C and a second semiconductor cell $T_2$, is reset, i.e., rendered nonconductive, at the desired instants, by letting the capacitor charge become superimposed, in opposite direction, to the current through the cell $T_1$, so that when the current becomes zero, the cell $T_1$ can become de-ionized. The capacitor C is then charged again via a diode $D_1$ and a choke coil L'. The resistance $r$ is large with respect to the ohmic resistance of the field winding $r_0$ so that when the electronic switch S' is open, substantially the entire current I will flow through the field winding, i.e., $\Delta I \approx 0$. If the electronic switch S' is continuously closed, practically the entire current I flows through the switch S' and the excitation current $I_{exc} \approx 0$. By means of the similarly constituted electronic switch S which is in parallel with the starting resistor R, it is possible, by keeping switch S open, to force the current I to flow through the resistor R thereby to limit the current I to the desired starting value. Conversely, the starting resistor R can be short-circuited by keeping the switch S closed so that the maximum current I will flow through the motor M.

The variable control circuit for elements $T_1$, $T_2$, is shown schematically at B.

If the semiconductor cell $T_1$, e.g., a triode, is periodically opened and closed, the resistor R will be periodically switched into and out of the series-circuit of the motor. In this way, the amplitude of the current I can be controlled. In practice, the resistor R may have such a resistance that, with the switch S open, the motor will, at standstill, draw the rated current. The torque produced by the motor can then be controlled by means of the electronic switch S'. This torque will be zero if switch S' is continuously closed whereas the torque will be at a maximum if the switch S is permanently open. In this way, the motor can be started smoothly, i.e., without jerkiness. As the motor develops its rotational speed, it generates a counter electromotive force which, if the resistance of R were to remain constant, would reduce the current I. This can be prevented by periodically short-circuiting the resistance of R by means of the switch S. When the motor has attained its operating r.p.m., the resistor R is short-circuited by keeping the switch S continuously closed. If the speed of the motor is to be increased still further, this can be done by shunting a portion of the current I flowing through the field winding $r_0$, namely, by periodically opening and closing the switch S'. This corresponds, basically, to conventional field weakening.

Figure 2:
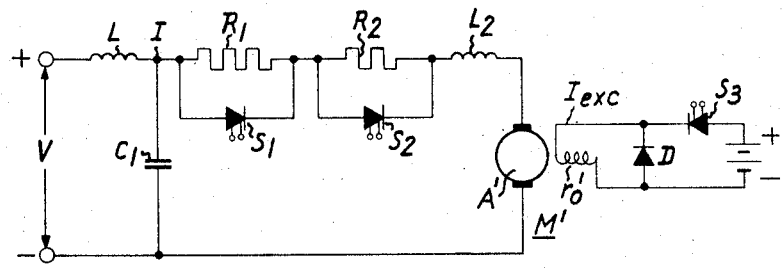
FIGURE 2 is a circuit diagram of another embodiment of the present invention, the motor being shown as a shunt-wound motor.

FIGURE 2 shows a shunt motor M' incorporating an armature A' and a shunt field winding $r_0'$. The armature is connected in series with two starting resistors $R_1$ and $R_2$, each of which has a respective electronic switch $S_1$, $S_2$, connected across it. This has the advantage that, when the switches $S_1$, $S_2$, are open, the motor will draw a very small starting current. Furthermore, the exciter current $I_{exc}$ can, as shown in the circuit of FIGURE 1, be controlled by means of an electronic switch $S_3$ which is connected in parallel with the field winding $r_0'$ and a by-pass diode D, the current flowing alternately through the diode D and the switch $S_3$. In this way, the speed and torque of the motor can be subjected to an additional control. The circuit is not affected by whatever large inductance $L_2$ is present, e.g., the inductance of the trolley wire (either the overhead wire or the "hot" third rail) in the case of electrically driven vehicles. It is also possible to obtain a direct current voltage from an alternating current mains by using a rectifier, which direct current is used to drive the motor.

In FIGURE 2, the variable resetting circuit for the various electronic switches is represented schematically by the second lead emanating from the respective diode symbols.

Electric motors may be braked by means of electronically controlled ohmic resistors. In a motor equipped with the starting arrangement according to the present invention, the starting resistors R (FIGURE 1) and $R_1$, $R_2$ (FIGURE 2) can be used as braking resistors, the same being controlled by the switches S (FIGURE 1) and $S_1$, $S_2$ (FIGURE 2). The braking can be carried out either by letting the heat generated in the resistors be dissipated, or the braking energy can be fed back to the supply means, the current being controlled by means of the electronically regulated resistors R, $R_1$, $R_2$.

The circuits of FIGURES 1 and 2 show relatively simple arrangements. Electrically driven vehicles will, in practice, be provided with a plurality of motors, in which case the control of the various motors will have to be coordinated. This can be done quite simply inasmuch as the electronic switches S, S', $S_1$, $S_2$, $S_3$, require but little energy. These switches can also be used to prevent spinning of the driving wheels by imparting to the motors the desired dynamic characteristics by means of the switches. If the reactance L of the circuit is not large enough, an additional inductance $L_2$ can be added. The pulse frequencies of the electronic switches will, in practice, be sufficiently high to keep current fluctuations to a minimum.

If the starting resistor R were omitted and if by-pass diodes $D_2$ were connected in parallel with the motor, the result would be the above-described method for starting and controlling the motor in a loss-free manner. This method can be used, in its simplest form, in the case of a reactance-free voltage source V, for example, in the case of FIGURE 1 but not FIGURE 2. Under certain circumstances it is expedient, in order to reduce losses or for other reasons, to provide a by-pass diode $D_2$ and furthermore, to combine the starting resistor R according to the present invention, i.e., the loss-free method, with the lossy method according to the present invention.

The invention can be used to advantage in all cases where the starting losses are of no particular significance but in which no pulse-shaped current can or may be taken from the voltage source. This is the case, for instance, with all electrically driven vehicles which are supplied from a third wire (overhead or rail), which rectify the alternating current derived from the power line and which adapt the amplitude of the rectified voltage to the speed of the motor by controlling the rectifiers, so that, according to the present invention, uncontrolled rectifiers may be used and the voltage be adapted to the motor by means of the contactlessly controlled resistance. This has the substantial advantage that the arrangement is very simple; furthermore, no reactive power is drawn from the third wire. In order to reduce loss, one may use one or several coarse switching stages incorporating mechanical switches, for example by serially or parallelly connecting two motors. Moreover, instead of operating the electronic switches periodically at a pulse frequency, a few or many of the stages of this resistance can be bridged with electronic switching means which are closed and, by means of capacitor pulses, opened, to produce the switching function of conventional modern mechanical starters. When the motor is rotating at full speed, it is possible to eliminate this plurality of electronic switches, each of which produces a certain drop of potential, by bridging the switches by a single electronic or even mechanical switch, thereby to reduce the over-all voltage drop.

When the preponderance of the reactance of the circuit is on the supply side, the voltage at the input side of the control circuit drops sharply at the instant at which the electronic switches are closed, i.e., the instant at which the starting resistance is short-circuited. In order to prevent this, a capacitor $C_1$ is provided, as shown in FIGURE 2. The higher the pulse frequency of the electronic switches $S_1$, $S_2$, the smaller can be the capacitance of capacitor $C_1$. The voltage breakdown can also be lessened by not operating the switches $S_1$ and $S_2$ of FIGURE 2 simultaneously but consecutively. This measure becomes particularly effective if there are more than two resistance stages. Here, these stages can be so selected that the voltages appearing across the individual resistances correspond to the dielectric strength of the electronic switches. If the supply voltage is, for example, 1000 v. and the dielectric strength of the electronic switches is such that each can take a voltage of 250 v., four such switches would be used and the starting resistance would then be subdivided into four sections. The subdivided sections of the starting resistance would thus act as a voltage divider.

It may be necessary, under certain circumstances, not to charge the capacitor C via diode $D_1$ and choke coil L', as illustrated, but to charge the capacitor up to the full voltage necessary to reset the cell $T_1$ by means of a separate circuit.

It will be understood that the above description of the present invention is susceptible to various modifications, changes, and adaptations, and the same are intended to be comprehended within the meaning and range of equivalents of the appended claims.

What is claimed is:
1. A circuit arrangement comprising in combination:
   (a) a motor having an armature and a field winding;
   (b) starting resistor means connected in series with said armature of said motor;
   (c) semiconductor cell means connected across said starting resistor means in consequence of which said starting resistor means are short-circuited when said cell means are conductive; and
   (d) variable means for periodically rendering said cell means alternately conductive and non-conductive, whereby the effective resistance of said starting resistor means may be varied by changing the ratio of the time interval during which said cell means are conductive to the time interval during which said cell means are non-conductive.

2. A circuit arrangement comprising, in combination:
   (a) a motor having an armature and a field winding;
   (b) semiconductor cell means connected across said field winding in consequence of which said field winding is short-circuited when said cell means are conductive; and
   (c) variable means for periodically rendering said cell means alternately conductive and non-conductive, whereby the effective excitation current flowing through said field winding may be varied by changing the ratio of the time interval during which said cell means are conductive to the time interval during which said cell means are non-conductive.

3. A circuit arrangement as defined in claim 2, further comprising a by-pass resistor connected across said field winding.

4. A circuit arrangement comprising, in combination:
(a) a motor having an armature and a field winding;
(b) starting resistor means connected in series with said armature of said motor;
(c) first semiconductor cell means connected across said starting resistor means in consequence of which said starting resistor means are short-circuited when said first cell means are conductive;
(d) first variable means for periodically rendering said cell means alternately conductive and non-conductive, whereby the effective resistance of said starting resistor means may be varied by changing the ratio of the time interval during which said first cell means are conductive to the time interval during which said cell means are non-conductive;
(e) second semiconductor cell means connected across said field winding in consequence of which said field winding is short-circuited when said second cell means are conductive; and
(f) second variable means for periodically rendering said second cell means alternately conductive and non-conductive, whereby the effective excitation current flowing through said field winding may be varied by changing the ratio of the time interval during which said second cell means are conductive to the time interval during which said cell means are non-conductive.

5. A circuit arrangement as defined in claim 4 wherein said motor is a series motor.

6. A circuit arrangement as defined in claim 4 wherein said motor is a shunt motor.

7. A circuit arrangement as defined in claim 4, further comprising a capacitor connected across the series-circuit constituted by said armature and said starting resistor means.

References Cited

UNITED STATES PATENTS

| | | | |
|---|---|---|---|
| 3,202,899 | 8/1965 | Gambill et al. | 318—345 |
| 3,068,390 | 12/1962 | Lichtenfels et al. | 318—422 |
| 2,539,190 | 1/1951 | Hibbard | 318—416 |
| 2,094,370 | 9/1937 | Moses | 318—422 |

ORIS L. RADER, *Primary Examiner.*

G. SIMMONS, *Assistant Examiner.*